US012637091B2

(12) United States Patent
Corghi

(10) Patent No.: US 12,637,091 B2
(45) Date of Patent: *May 26, 2026

(54) APPARATUS FOR CALIBRATING AN ADVANCED DRIVER ASSISTANCE SYSTEM SENSOR OF A VEHICLE

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 80 days.

This patent is subject to a terminal disclaimer.

(21) Appl. No.: 18/662,316

(22) Filed: May 13, 2024

(65) Prior Publication Data

US 2024/0294176 A1 Sep. 5, 2024

Related U.S. Application Data

(63) Continuation of application No. 17/846,095, filed on Jun. 22, 2022, now Pat. No. 11,999,361, which is a
(Continued)

(30) Foreign Application Priority Data

Jan. 25, 2019 (IT) ........................ 102019000001167

(51) Int. Cl.
*B60W 50/00* (2006.01)
*B60S 5/00* (2006.01)
*G01S 7/40* (2006.01)

(52) U.S. Cl.
CPC ............... *B60W 50/00* (2013.01); *B60S 5/00* (2013.01); *G01S 7/40* (2013.01);
(Continued)

(58) Field of Classification Search
CPC .................................................... B60W 50/00
See application file for complete search history.

(56) References Cited

U.S. PATENT DOCUMENTS

| | | | |
|---|---|---|---|
| 7,121,011 B2 | 10/2006 | Murray et al. | |
| 8,538,724 B2 | 9/2013 | Corghi | |

(Continued)

FOREIGN PATENT DOCUMENTS

| | | |
|---|---|---|
| CN | 205449517 U | 8/2016 |
| DE | 102009009046 A1 | 10/2009 |

(Continued)

*Primary Examiner* — Michael A Berns
(74) *Attorney, Agent, or Firm* — Chrisman Gallo Tochtrop LLC

(57) ABSTRACT

An apparatus (1) for calibrating an ADAS sensor of a vehicle (9) includes: a base unit (2) including a plurality of wheels (20); a support structure (3) integral with the base unit (2); a vehicle calibration assistance structure (4), mounted on the support structure (3) and including a calibration device (41, 42) configured to facilitate aligning or calibrating the ADAS sensor; a position detector, configured to capture values of a position parameter representing a position of the support structure (3) relative to the vehicle (9); a processing unit, configured to process the values of the position parameter in real time to derive information regarding an actual position of the support structure (3) relative to the vehicle (9).

20 Claims, 11 Drawing Sheets

Related U.S. Application Data continuation of application No. 16/748,980, filed on Jan. 22, 2020, now Pat. No. 11,390,289.

(52) U.S. Cl.
 CPC ............... *B60W 2050/0083* (2013.01); *B60W 2420/403* (2013.01); *B60W 2420/408* (2024.01)

(56) References Cited

U.S. PATENT DOCUMENTS

| | | | |
|---|---|---|---|
| 9,841,503 | B2 | 12/2017 | Olsson et al. |
| 9,952,317 | B2 | 4/2018 | Valois et al. |
| 10,323,936 | B2 | 6/2019 | Leikert |
| 10,634,488 | B2 | 4/2020 | Stieff et al. |
| 10,794,996 | B2 | 10/2020 | Qiu et al. |
| 10,921,426 | B2 | 2/2021 | Tang et al. |
| 11,390,289 | B2 | 7/2022 | Corghi |
| 11,465,632 | B2 | 10/2022 | Corghi |
| 11,676,304 | B2 * | 6/2023 | Corghi .................. G01S 13/931 73/1.79 |
| 11,982,528 | B2 * | 5/2024 | Lai ..................... G01B 11/2755 |
| 11,999,361 | B2 * | 6/2024 | Corghi .................. G01S 7/4026 |
| 12,172,654 | B2 * | 12/2024 | Jefferies ................ B60W 40/10 |
| 2004/0049930 | A1 | 3/2004 | Murray |
| 2005/0096807 | A1 | 5/2005 | Murray et al. |
| 2011/0077900 | A1 | 3/2011 | Corghi |
| 2013/0325252 | A1 | 12/2013 | Schommer et al. |
| 2018/0188022 | A1 | 7/2018 | Leikert |
| 2019/0249985 | A1 | 8/2019 | Stieff et al. |
| 2019/0249986 | A1 | 8/2019 | Leikert |
| 2019/0331482 | A1 | 10/2019 | Lawrence et al. |
| 2020/0074675 | A1 | 3/2020 | Cejka et al. |
| 2020/0130188 | A1 | 4/2020 | Lawrence et al. |
| 2020/0239009 | A1 | 7/2020 | Corghi |
| 2020/0239010 | A1 | 7/2020 | Corghi |
| 2020/0273206 | A1 | 8/2020 | Corghi |
| 2021/0223034 | A1 | 7/2021 | Stieff et al. |
| 2022/0315016 | A1 | 10/2022 | Corghi |
| 2024/0294176 | A1 * | 9/2024 | Corghi ................ G01B 11/275 |

FOREIGN PATENT DOCUMENTS

| | | |
|---|---|---|
| EP | 2302318 | 3/2011 |
| WO | 2004102114 | 11/2004 |
| WO | 2017016541 | 2/2017 |
| WO | 2018067354 | 4/2018 |

* cited by examiner

APPARATUS FOR CALIBRATING AN ADVANCED DRIVER ASSISTANCE SYSTEM SENSOR OF A VEHICLE

This application is a Continuation of U.S. application Ser. No. 17/846,095, filed on Jun. 22, 2022, which was a Continuation of U.S. application Ser. No. 16/748,980 filed on Jan. 22, 2020, which claimed the benefit of Italian Application No. 102019000001167, filed Jan. 25, 2019, the entire disclosures of which are hereby incorporated herein by reference.

This invention relates to an apparatus and a method for calibrating an advanced driver assistance system sensor of a vehicle.

In the field of driver assistance systems, target units used in procedures for aligning and calibrating the sensors of advanced driver assistance systems may be mounted on trolley-like structures.

For example, patent document WO2018/067354A1 provides a trolley-like structure used to support an optical target for calibrating a vehicle camera and a metallic target for calibrating a radar sensor of the vehicle.

Other trolley-like structures used for calibrating vehicle sensors are described in patent documents US2018/0188022A1, WO2017/016541 and WO2004/102114A1.

These structures must be positioned in front of the vehicle at a predetermined distance and oriented in a predetermined manner relative to the vehicle. Indeed, every vehicle manufacturer specifies the optimal position of the target unit; for each vehicle, therefore, the operator responsible for calibration has to move the structure to the optimum position specified by the manufacturer of the vehicle.

Placing the structure at the optimum position may, however, be a tedious and demanding task and normally requires experience of the operator moving the structure; moreover, manoeuvring and positioning the calibration structure may be highly time consuming.

This invention has for an aim to provide an apparatus and a method for calibrating an advanced driver assistance system sensor of a vehicle to overcome the above mentioned drawbacks of the prior art.

This aim is fully achieved by the apparatus and method for calibrating an advanced driver assistance system sensor of a vehicle as characterized in the appended claims.

According to one aspect it, this disclosure relates to an apparatus for calibrating an ADAS sensor (at least one) of a vehicle. By ADAS sensor is meant an advanced driver assistance system sensor of a vehicle.

The apparatus comprises a base unit. Preferably, the base unit includes a plurality of wheels rotating about respective axes of rotation. Preferably. at least one wheel of the plurality of wheels can swivel about a respective swivel axis. Still more preferably, all the wheels of the plurality of wheels can swivel about respective swivel axes. The swivel axis of each wheel is at right angles (or substantially at right angles) to the respective axis of rotation. The expression at right angles or substantially at right angles is used to mean an inclination between 80° and 100°, preferably between 85° and 110° and, still more preferably, 90°.

Preferably, the swivel axis is oriented along a vertical direction, parallel to the weight force (or along a substantially vertical direction).

In an embodiment, the wheels are spherical; in that case, the wheels can rotate (and swivel) about an axis of rotation parallel to the floor and can also swivel (and rotate) about a plurality of swivel axes, where at least one swivel axis of the plurality of swivel axes is at right angles to the axis of rotation.

The base unit is thus movable on wheels. In particular, the wheels are useful to move the apparatus from a rest position, where it is away from the service area, to a working position, where it is close to, and directed at, the service area. In effect, when the apparatus is at the rest position, the service area may be used for other wheel service operations such as wheel balancing, for example.

In other embodiments, the base unit is mounted on rails.

The apparatus comprises a support structure. The support structure is connected to (or integral with) the base unit.

The apparatus comprises a vehicle calibration assistance structure. The vehicle calibration assistance structure is mounted on the support structure. The vehicle calibration assistance structure includes a calibration device. The calibration device is configured to facilitate alignment or calibration of the (at least one) ADAS sensor of the vehicle.

In an embodiment, the support structure can be driven by a person (that is, an operator responsible for calibration) in such a way that the vehicle sensor can "view" (or "strike" or "detect"—these terms being used synonymously in the context of this disclosure) the calibration device. It should be noted that use of the verb "to view" is not intended as limiting the disclosure to optical sensors; in effect, the vehicle sensor might also be a radar sensor or other types of sensors, as described in this disclosure.

The apparatus comprises a position detector. The position detector is configured to capture values of a position parameter (preferably in real time). The position parameter represents a position of the support structure. More specifically, the position parameter represents the position of the support structure relative to a fixed reference or relative to a reference element located on the vehicle. By position is meant a distance and/or orientation and/or vertical height of the support structure relative to the vehicle.

The apparatus comprises a processing unit. The processing unit is operatively connected to the position detector to receive the values of the position parameter (in real time). The processing unit is configured to process the values of the position parameter (in real time). The processing unit is configured to derive information regarding an actual position of the support structure (and/or of the vehicle calibration assistance structure) relative to the vehicle.

The information regarding the actual position of the support structure (and/or of the vehicle calibration assistance structure) relative to the vehicle may include a distance of the support structure (and/or of the vehicle calibration assistance structure) from the vehicle (that is, from a reference element located on the vehicle); in addition (or, if necessary, alternatively), the information regarding the actual position of the support structure (and/or of the vehicle calibration assistance structure) relative to the vehicle may include an orientation of the support structure (and/or of the vehicle calibration assistance structure) relative to an axis of the vehicle (for example, the thrust axis or the axis of symmetry).

In an embodiment, the information regarding the actual position also includes a height of the support structure relative to the floor of the service area which the vehicle is located on).

It should be noted that it is not essential for the information regarding the actual position to include the height because positioning in height may be carried out separately—for example, using a laser height distance meter (oriented along the vertical direction), or a graduated rod slidable along the vertical direction.

In an embodiment, the apparatus (or the support structure) comprises a motion actuator connected to the base unit to move the support structure.

In this embodiment, therefore, the support structure is self-propelled by means of the motion actuator. The motion actuator may include an electric motor and a battery or a connection to an electric grid.

In an embodiment, the processing unit is configured to generate a drive signal as a function of the information regarding the actual position of the support structure relative to the vehicle and to send the drive signal to the motion actuator. In an embodiment, therefore, the processing unit uses the drive signal to drive the movement of the support structure.

In an embodiment, the support structure can be driven manually by the person. In an embodiment, the support structure includes (in addition or alternatively to the motion actuator) a grippable portion which can be held by the person to drive the support structure manually. Preferably, the grippable portion includes one or more handles.

In an embodiment, the apparatus comprises a remote control, operatively connected to the motion actuator to send drive commands to the motion actuator. In this embodiment, therefore, the support structure can be driven by the person using the remote control (in addition or alternatively to the possibility of driving manually with the grippable portion or automatically with the processing unit to control the motion actuator).

In other imaginable embodiments, the support structure can be driven either by a person (with the grippable portion and/or with the remote control or automatically by the processing unit; depending on circumstances, the person can select a manual mode (in which the structure is moved manually using the grippable portion), a semi-automatic mode (in which the structure is moved using the remote control) or an automatic mode (in which the structure is self-propelled and driven by the processing unit). In an embodiment, the interface includes a touch screen and also works as a remote control).

In an embodiment, the vehicle calibration assistance structure is moved along the support structure in the vertical direction by means of an actuator (for example, an electric motor). The actuator is controlled (or controllable) by the person through a drive unit (for example, a switch panel or a lever). In an embodiment, the drive unit is associated with the support structure, preferably in proximity to the grippable portion.

In an embodiment, the apparatus comprises an interface, configured to provide the person driving the support structure (manually or with the remote control) with real time information regarding the actual position of the support structure relative to the vehicle. So, the apparatus is configured to provide the person with a feedback information, representative of the actual position of the support structure (or of the vehicle calibration assistance structure) relative to the vehicle. Preferably, the feedback information is provided in real time; in other embodiments, the feedback information is provided not in real time, but with a predetermined delay.

Thus, the person driving the support structure receives information in real time helping them to view with a good degree of precision where the support structure is relative to the vehicle (hence, relative to the position for calibrating the ADAS sensor, as specified by the vehicle manufacturer). The actual position may include a combination of spatial coordinates having as reference the vehicle (or a reference element thereon) or a fixed target (whose position relative to the vehicle is known). For example, if the person knows they have to be positioned at a certain distance or with a certain orientation (for example, because they have read it in the instruction manual supplied by the manufacturer, or preferably because the processing unit connected to a memory has provided the reference position), the interface communicates the actual distance and orientation in real time. That way, the person knows when the optimum position specified by the manufacturer has been reached or is reasonably close.

In an embodiment, the apparatus comprises a memory. The memory is connected to the processing unit. The memory includes (i.e., contains) reference data. The reference data relate to a predetermined position of a reference calibration device relative to a reference vehicle. The reference data may be supplied, for example, by the car manufacturer. The processing unit is configured to derive information regarding a reference position of the support structure relative to the vehicle as a function of the reference data stored in the memory. The reference position may include a combination of spatial coordinates having as reference the vehicle (or a reference element thereon) or a fixed target (whose position relative to the vehicle is known). For example, if the reference data require positioning the structure (for calibrating a certain ADAS sensor) at a certain distance or with a certain orientation relative to a certain vehicle, the processing unit derives from those reference data information as to the position the support structure must reach relative to the vehicle positioned in the service area. In an embodiment, the interface is configured to provide the person with the information regarding the reference position of the support structure relative to the vehicle. For example, the interface may display the actual position and the reference position in a system of spatial coordinates; the person viewing the two positions on the display can see how far the actual position is from the reference position.

In an embodiment, the processing unit is configured to compare in real time the information regarding the actual position with the information regarding the reference position. In an embodiment, the processing unit is configured to derive information regarding a difference between the actual position and the reference position of the support structure relative to the vehicle.

In an embodiment, the information regarding the difference between the actual position and the reference position may include a difference parameter whose value is proportional to the difference between the actual position and the reference position. The difference parameter may, in one embodiment, be a numeric parameter on a scale of 1 to 10 (where 10 indicates, for example, a minimum difference between the actual position and the reference position) or, in another embodiment, a colour parameter (on a colour scale where, for example, green indicates a large difference between the actual position and the reference position) or, in another embodiment, a sound parameter (where, for example, a sound repeated very frequently indicates a minimum difference between the actual position and the reference position) or, in yet another embodiment, a visual element (for example, a flashing light whose flashing frequency is proportional to the difference between the actual position and the reference position).

In an embodiment, the information regarding the difference between the actual position and the reference position includes movement instructions. The movement instructions are configured to serve as a guide for the person moving the support structure. In an embodiment, the movement instructions include a signal which tells the person that the structure should be moved or turned in a certain direction to reduce the difference between the actual position and the reference position. In one embodiment, the movement instructions include arrows displayed on the interface to indicate the direction/directions in which the structure must be moved. In another embodiment, the movement instructions include a voice over telling the person where to move the structure.

In an embodiment, the processing unit is configured to receive a first selection parameter relating to a type of vehicle positioned in the service area. The first selection parameter includes the vehicle make and/or model.

In an embodiment, the apparatus comprises a communications port connectable to a control unit of the vehicle and connected to the processing unit to retrieve information including the first selection parameter from the control unit (for example, an identification code).

In an embodiment, the interface is configured to allow the person to enter the first selection parameter.

In an embodiment, the processing unit is configured to select a first reference data subset from the memory based on the first selection parameter. More specifically, the first reference data subset relates to a predetermined position of a reference calibration device relative to a reference vehicle of the type associated with the first selection parameter.

In an embodiment, the processing unit is configured to derive the information regarding the reference position of the support structure relative to the vehicle as a function of the first reference data subset.

In an embodiment, the processing unit is configured to receive a second selection parameter. The second selection parameter relates to the type of ADAS sensor to be calibrated. In an embodiment, the interface is configured to allow the person to enter the second selection parameter.

In an embodiment, the processing unit is configured to select a second reference data subset from the memory based on the second selection parameter. More specifically, the second reference data subset relates to a predetermined position of a reference calibration device, configured to calibrate the ADAS sensor associated with the second selection parameter, relative to a reference vehicle.

In an embodiment, the processing unit is configured to derive the information regarding the reference position of the support structure relative to the vehicle as a function of the second reference data subset.

In an embodiment, the processing unit is configured to receive the first and second selection parameters and to select from the memory a third reference data subset given by the intersection of the first and second reference data subsets. More specifically, the third reference data subset relates to a predetermined position of a reference calibration device, configured to calibrate the ADAS sensor associated with the second selection parameter, relative to a reference vehicle of the type associated with the first selection parameter.

In an embodiment, the interface is mounted on the support structure. In an embodiment, the interface is associated with the support structure. In an embodiment, the interface includes a screen (or monitor) mounted on the support structure. In an embodiment, the screen is mounted on the support structure removably. That way, the interface is clearly visible to the person while driving the support structure. Also, the person may remove the screen from the support structure if they prefer to be at another position—for example inside the vehicle compartment.

In an embodiment, the screen is movably associated with the support structure so it can be oriented in a way that facilitates the person's view.

In an embodiment, the interface includes a respective processor, connected to the processing unit. In an embodiment, the interface is configured to help the person with operations other than calibrating the ADAS sensors; for example, the interface may be configured to help the person with troubleshooting, removing errors from the electronic control unit or checking the operation of the actuators and/or of the sensors.

In an embodiment, the position detector includes an optical device of the support structure, associated with the support structure and oriented in a forward direction towards the service area to view graphical features of the vehicle (for example, the vehicle's logo or an adhesive label placed on the vehicle). In an embodiment, the optical device of the support structure includes two cameras configured to view respective targets—for example, adhesive or mounted on brackets—associated with the vehicle's front wheels.

In an embodiment, the position detector includes a fixed positioning target element (spaced from the support structure). In an embodiment, the fixed positioning target element (also called fixed target) includes predetermined graphical features. The fixed positioning target element provides an absolute reference system for positioning the support structure.

In an embodiment, the position detector includes a first matching camera, oriented in a first lateral direction towards the fixed positioning target element (that is, the graphical features of the fixed positioning target element).

The processing unit is connected to the first optical device and to the first matching camera, to correlate the image data captured by the first optical device with the image data captured by the first matching camera, so as to derive the information regarding the actual position of the support structure relative to the vehicle.

In an embodiment, the position detector includes a positioning target element of the support structure. The positioning target element of the support structure is associated with the support structure and is oriented in a forward direction towards the service area.

In an embodiment, the position detector includes a positioning device which is spaced from the support structure. In an embodiment, the positioning device is movable on wheels or on rails extending parallel to the travelling direction of the vehicle located in the service area. In an embodiment, the positioning device includes an optical device of the positioning device, oriented in a second lateral direction to view graphical features of the vehicle (for example, of the vehicle's wheels or of an adhesive label applied to a wheel of the vehicle). In an embodiment, the positioning device includes a matching camera of the positioning device, oriented in a backward direction, opposite to the forward direction, to view the positioning target element. The positioning device provides a relative reference system, relative to the vehicle, for positioning the support structure. The processing unit is connected to the optical device and to the matching camera of the positioning device, to process the image data captured by the optical device and by the matching camera of the positioning device, in order to derive the information regarding the actual position of the support structure relative to the vehicle.

In an embodiment, the position detector includes at least a distance meter; at least a distance meter a positioning target element associated with one of the vehicle's wheels (preferably one of the front wheels).

As for the distance meter technology, in an embodiment, the distance meter is an optical distance sensor. In an embodiment, the distance meter is an acoustic distance sensor (for example, an ultrasonic wave sensor). In an embodiment, the distance meter is a Bluetooth distance sensor.

In an embodiment, the distance meter is mounted on the support structure, preferably removably. In another embodiment, the distance meter is mounted, preferably removably, on the positioning target element associated with the wheels.

In an embodiment, the distance meter is configured to measure (in contactless mode) the distance of an object relative to a reference point of the distance meter itself (e.g., the midpoint of the rear side. In an embodiment, the distance meter is a laser distance meter which projects a laser beam on an object whose distance is to be measured. In an embodiment, the distance meter also comprises an accelerometer (e.g., a triaxial accelerometer) which allows calculating the distance in a horizontal direction (at right angles to the vertical direction) and/or in a vertical direction when the measuring direction is inclined. In an embodiment, the distance meter is configured to view graphical features of the positioning target element. The distance meter thus measures a distance of the support structure from the vehicle.

In an embodiment, the position detector includes a pair of distance meters and a pair of positioning target elements associated with respective wheels (preferably the front wheels) of the vehicle; the distance meters of the pair are each configured to measure the distance of the respective positioning target element of the pair.

In an embodiment, the at least one distance meter (or pair of distance meters) is associated with the wheel (or wheels) and the corresponding positioning target element (or the corresponding positioning target elements) is associated with the support structure.

In an embodiment, the position detector includes a first pair of heads, mounted on the support structure. In an embodiment, the position detector includes a second pair of heads associated with respective wheels (preferably the rear wheels) of the vehicle. The heads of the first pair of heads each include an emitter/transmitter (in one embodiment, LED; in another embodiment, laser), directed at a respective head of the second pair of heads.

The heads of the first pair of heads each include a first and a second end; the first and second ends are each provided with a receiver and/or an emitter, configured to come into communication with a corresponding emitter or receiver of another head. For these emitters/receivers, various different technological solutions may be used: for example, CCD or laser or LED.

In an embodiment, each of the heads may include a first receiver, directed at the respective head of the second pair of heads (to receive a signal therefrom). Each head of the first pair of heads may include a first emitter/transmitter, operatively directed at the other head of the first pair of heads.

In an embodiment, each head of the first pair of heads may include a second receiver, operatively directed at the other head of the first pair of heads. Each head of the first pair of heads may include a second emitter/transmitter, operatively directed at the other head of the first pair of heads.

What is described above with regard to the first pair of heads also applies to the second pair of heads.

The first and the second pair of heads—when they are connected to the structure and to the vehicle in such a way that the heads are in communication with each other, those mounted on the structure are in communication with each other and each head mounted on the vehicle is in communication with a corresponding head mounted on the structure—are configured to measure the orientation of the support structure relative to the thrust axis of the vehicle.

The at least one distance meter may be used in combination with the heads.

In an embodiment, the calibration device includes a target panel having a surface bearing a combination of predetermined graphical features. The predetermined graphical features of the target panel are supplied by the vehicle manufacturer and may therefore differ from one vehicle to another. In this embodiment, the calibration device is configured to calibrate an ADAS camera of the vehicle.

In an embodiment, the graphical features are pre-printed on the target panel. In an embodiment, the target panel is defined by a screen, configured to display the combination of predetermined graphical features. In an embodiment, the calibration device includes a projector, configured to project the predetermined graphical features on the target panel.

In an embodiment, the calibration device includes a reflector having a metallic surface or a surface capable of reflecting electromagnetic waves at the frequencies at which radar sensors of ADAS systems work. In this embodiment, the calibration device is configured to facilitate alignment or calibration of an ADAS radar sensor of the vehicle.

In an embodiment, the calibration device includes a target panel configured to calibrate a LIDAR sensor or a camera of the advanced driver assistance system of the vehicle. The target panel for calibrating a LIDAR sensor is reflective in one embodiment and retroreflective in another embodiment.

In an embodiment, the calibration device includes a device configured to calibrate or align an infrared ADAS sensor.

In an embodiment, the apparatus includes a plurality of calibration devices of the kinds described above, designed to be removably coupled to the support structure (in one embodiment, one in place of another). In another embodiment, the apparatus includes a plurality of calibration devices of the kinds described above, fixed to respective portions of the support structure.

In an embodiment, the position detector includes a laser blade. The laser blade is preferably associated with the support structure and directed at the service area. In an embodiment, the laser blade is oriented perpendicularly to the target panel and/or to the reflector. In an embodiment, the laser blade is configured to facilitate alignment of the support structure relative to the axis of symmetry of the vehicle.

In an embodiment, the laser blade can swivel about at least one axis which is integral with the support structure to illuminate a point or a line of the vehicle, in order to help the person orient or position the support structure. More specifically, the laser blade is useful for positioning the support structure relative to an axis of symmetry (in effect, the laser blade detects the front logo and/or the front end).

In an embodiment, where the structure has to be positioned with reference to the axis of symmetry of the vehicle, the laser blade is useful for performing this positioning operation.

In an embodiment, where the structure has to be positioned with reference to the thrust axis of the vehicle, the laser blade is useful for pre-positioning the structure relative to an axis of symmetry of the vehicle; other instruments—such as the heads described herein—can then be used for positioning relative to the thrust axis.

This disclosure also relates to a method for calibrating a sensor (at least one) of an advanced driver assistance system (ADAS) of a vehicle. The vehicle is positioned in a service area.

The method comprises a step of preparing a base unit.

The method comprises a step of preparing a support structure, integral with the base unit. The vehicle calibration assistance structure includes a calibration device (at least one), configured to facilitate alignment or calibration of the ADAS sensor of the vehicle.

The method comprises a step of positioning the support structure in proximity to the service area in such a way that the sensor of the vehicle can "view" (or "strike" or "detect") the calibration device. Preferably, the support structure is positioned in front of the vehicle (or on a rear side of the vehicle). Preferably, the support structure is positioned on a symmetry axis (or thrust axis) of the vehicle; therefore, the support structure and the vehicle are aligned along the symmetry axis (or thrust axis) of the vehicle. The step of positioning includes rotating a plurality of wheels about respective axes of rotation and swivelling at least one wheel of the plurality of wheels (preferably all the wheels of the plurality of wheels) about a respective swivel axis, at right angles to the respective axis of rotation.

In an embodiment, the step of positioning is carried out manually by a person driving the support structure. Thus, the step of positioning includes a step of the person manually moving the support structure.

In an embodiment, the step of positioning is carried out remotely by a person, using a remote control.

In an embodiment, the method comprises a step of providing the person with real time information, through an interface, regarding the actual position of the support structure relative to the vehicle.

In an embodiment, the step of positioning includes generating a drive signal in the processing unit (as a function of the information regarding the actual position and the reference position) and sending a drive signal to a motion actuator associated with the support structure; the motion actuator then moves the support structure.

The method comprises a step of capturing, with a position detector, values of position parameters representing a position of the support structure relative to the vehicle.

The method comprises a step of processing in a processing unit the values of position parameters in order to derive information regarding an actual position of the support structure relative to the vehicle.

In an embodiment, the method comprises a step of providing (or supplying) the person with real time information, through an interface, regarding the actual position of the support structure. The person is thus assisted in the step of positioning.

The method comprises a step of sending a calibration command to an electronic control unit of the vehicle.

In an embodiment, the method comprises a step of detecting (or viewing) the calibration device through the vehicle sensor to be calibrated.

The method comprises a step of processing in a processing unit data received from the electronic control unit of the vehicle (in order to calibrate or align the sensor).

In an embodiment, the method comprises a step of deriving information regarding a reference position of the support structure relative to the vehicle as a function of reference data stored in a memory.

In an embodiment, the method comprises a step of receiving a first selection parameter relating to a type of vehicle positioned in the service area.

In an embodiment, the method comprises a step of selecting a first reference data subset from the memory, based on the first selection parameter.

In an embodiment, the information regarding the reference position of the support structure relative to the vehicle is derived as a function of the first reference data subset.

In an embodiment, the method comprises a step of receiving a second selection parameter relating to a type of ADAS sensor to be calibrated.

In an embodiment, the method comprises a step of selecting a second reference data subset from the memory, based on the second selection parameter.

In an embodiment, the information regarding the reference position of the support structure relative to the vehicle is derived as a function of the second reference data subset.

In an embodiment, the information regarding the reference position of the support structure relative to the vehicle is derived as a function of a combination of the first and second reference data subsets.

In an embodiment, the method comprises a step of comparing the information regarding the actual position with the information regarding the reference position in order to provide the person with information, through the interface, regarding a difference between the actual position and the reference position of the support structure relative to the vehicle, or in order to use that information to generate the drive signal directed at the motion actuator.

In an embodiment, the information regarding the difference between the actual position and the reference position includes movement instructions serving as a guide for the person moving the support structure.

In an embodiment, the interface is integral with the support structure.

In an embodiment, the interface is mounted removably on the support structure. In an embodiment, the interface includes a screen.

In an embodiment, the support structure includes a grippable portion.

In an embodiment, in the step of driving manually, the person moves the support structure using the grippable portion and simultaneously looks at the screen to receive real time information regarding the actual position of the support structure relative to the vehicle.

What is described (in connection with both the system and the method) with reference to the front of the vehicle also applies, with the necessary changes made, to the back and sides of the vehicle. In effect, the system can be configured to calibrate front, rear and/or side ADAS sensors of the vehicle.

These and other features will become more apparent from the following detailed description of a preferred, non-limiting embodiment, with reference to the accompanying drawings, in which.

Figure 1:
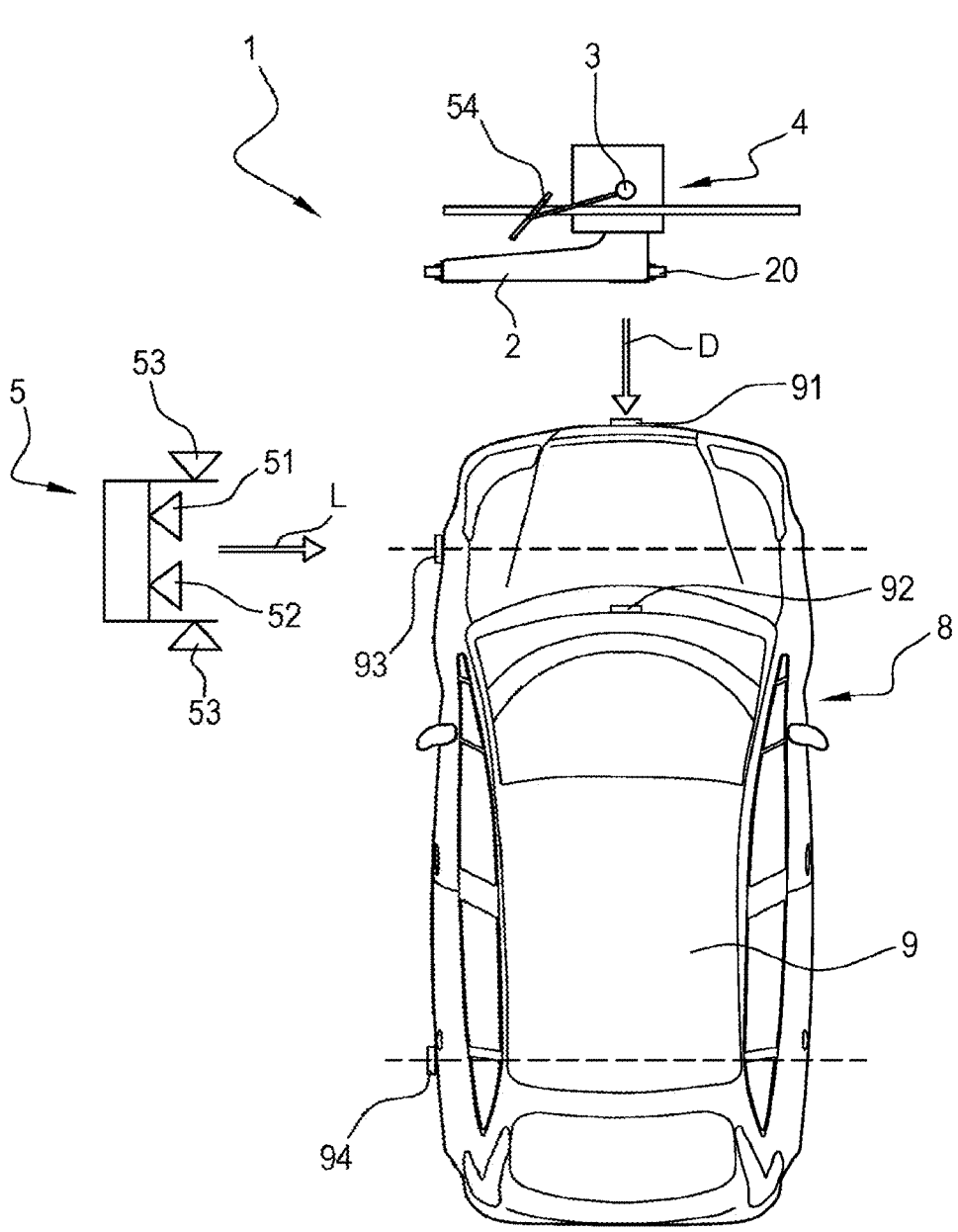
FIG. 1 shows an apparatus for calibrating an ADAS sensor of a vehicle positioned in a service area, according to a possible embodiment of this disclosure.
Figure 2:
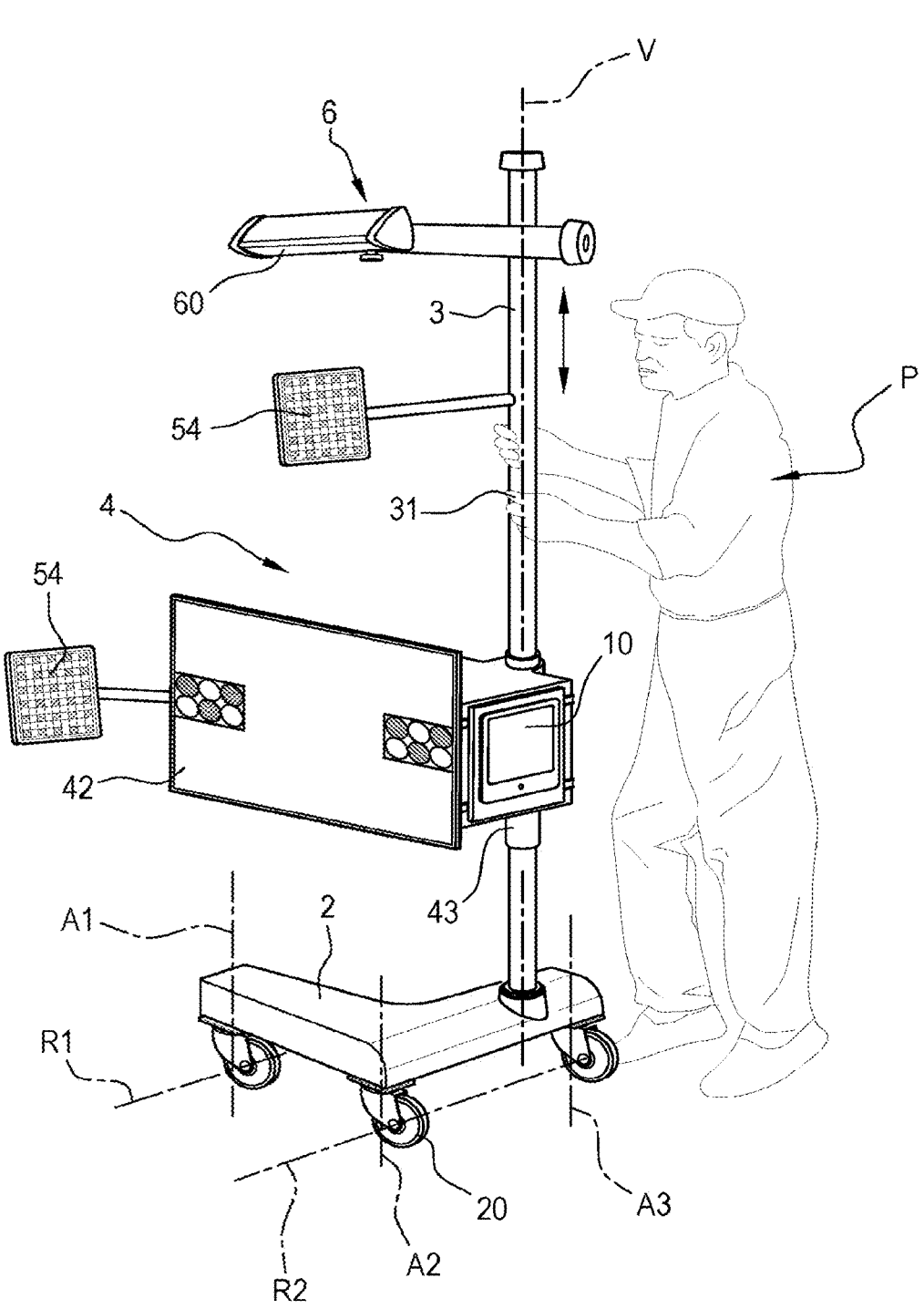
FIGS. 2 and 3 show a support structure of the apparatus of FIG. 1 in respective configurations.
Figure 3:
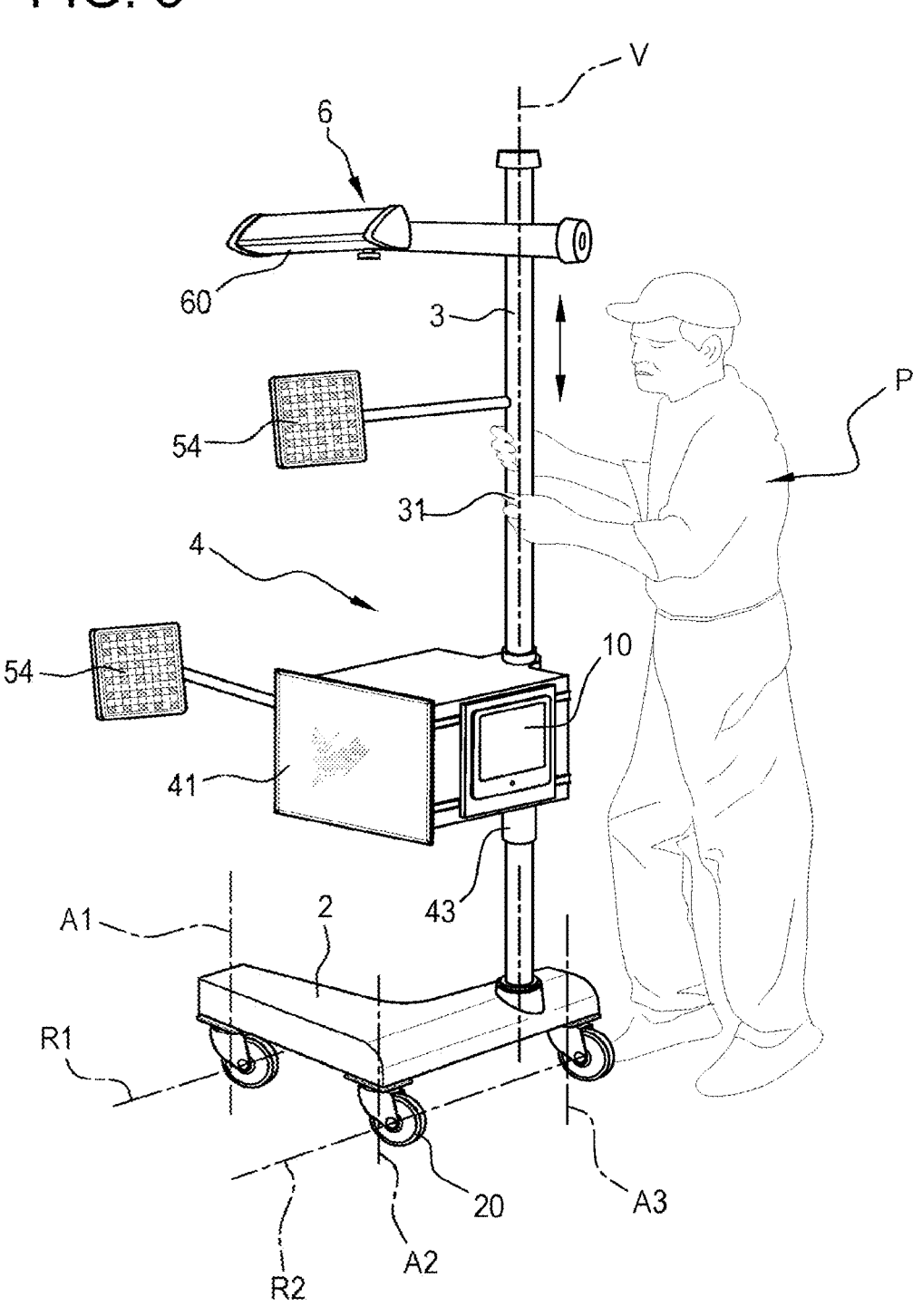
Figure 4:
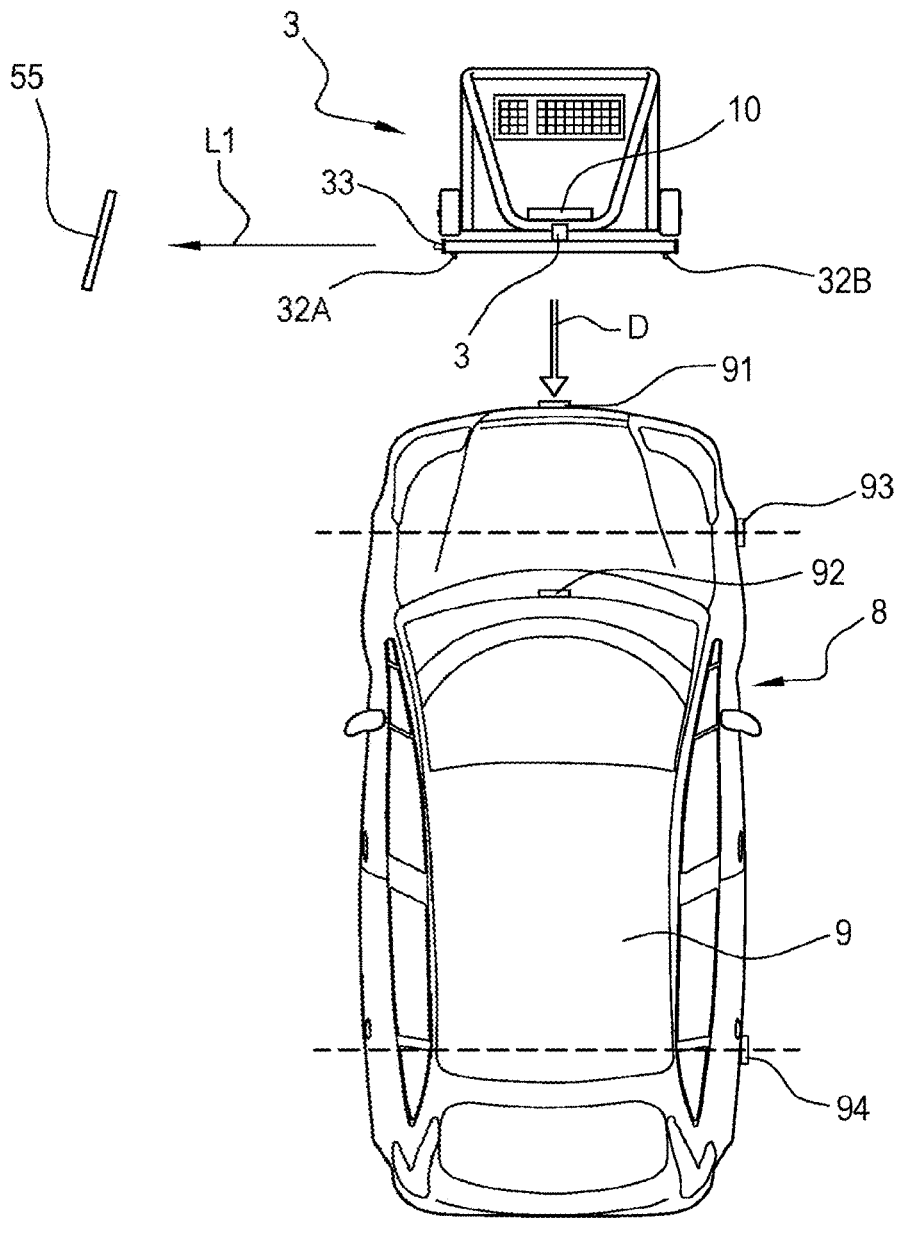
FIG. 4 shows an apparatus for calibrating an ADAS sensor of a vehicle positioned in a service area, according to a further embodiment of this disclosure.
Figure 5:
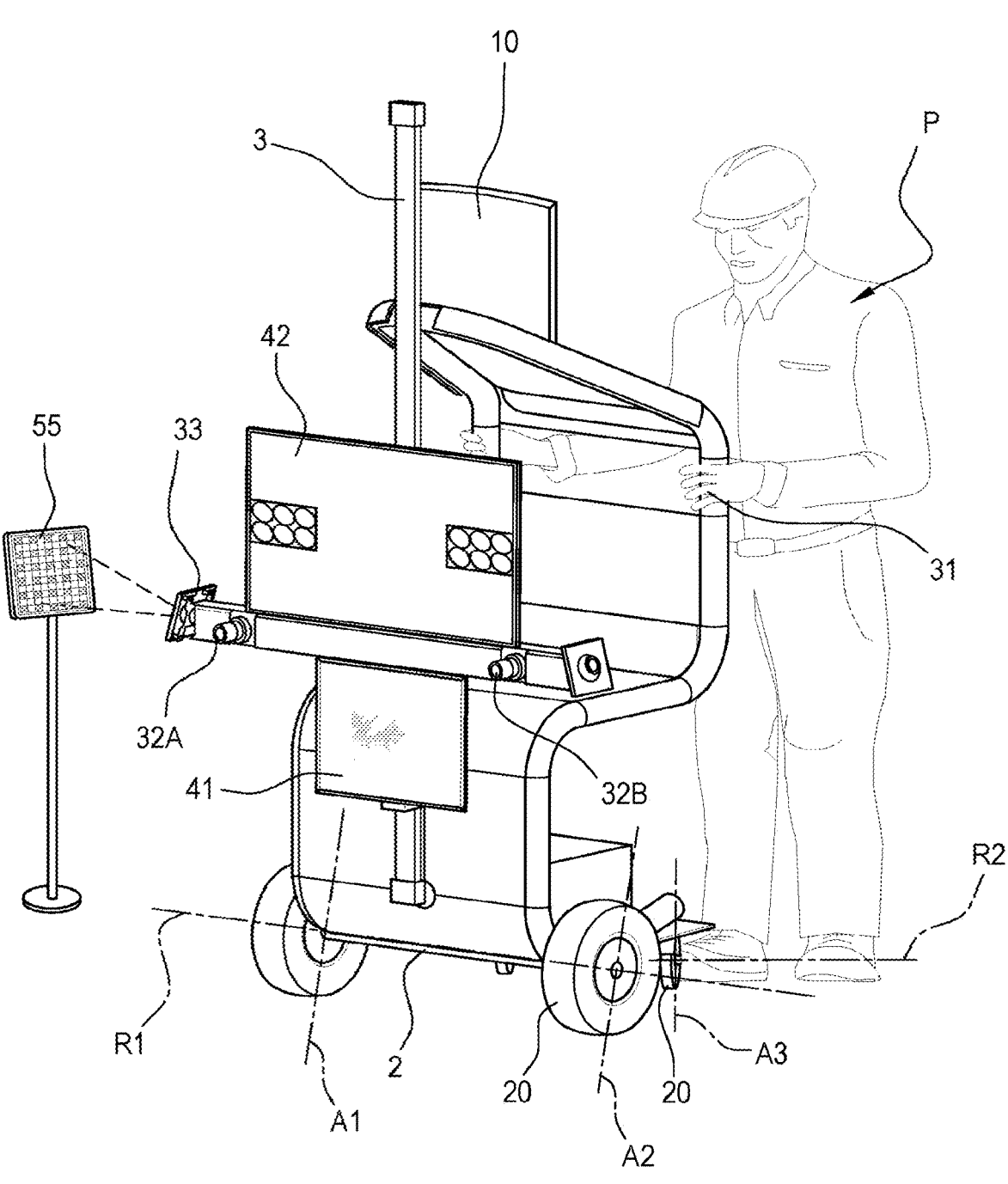
FIG. 5 shows a support structure and a fixed positioning target element of the apparatus of FIG. 4.
Figure 6:
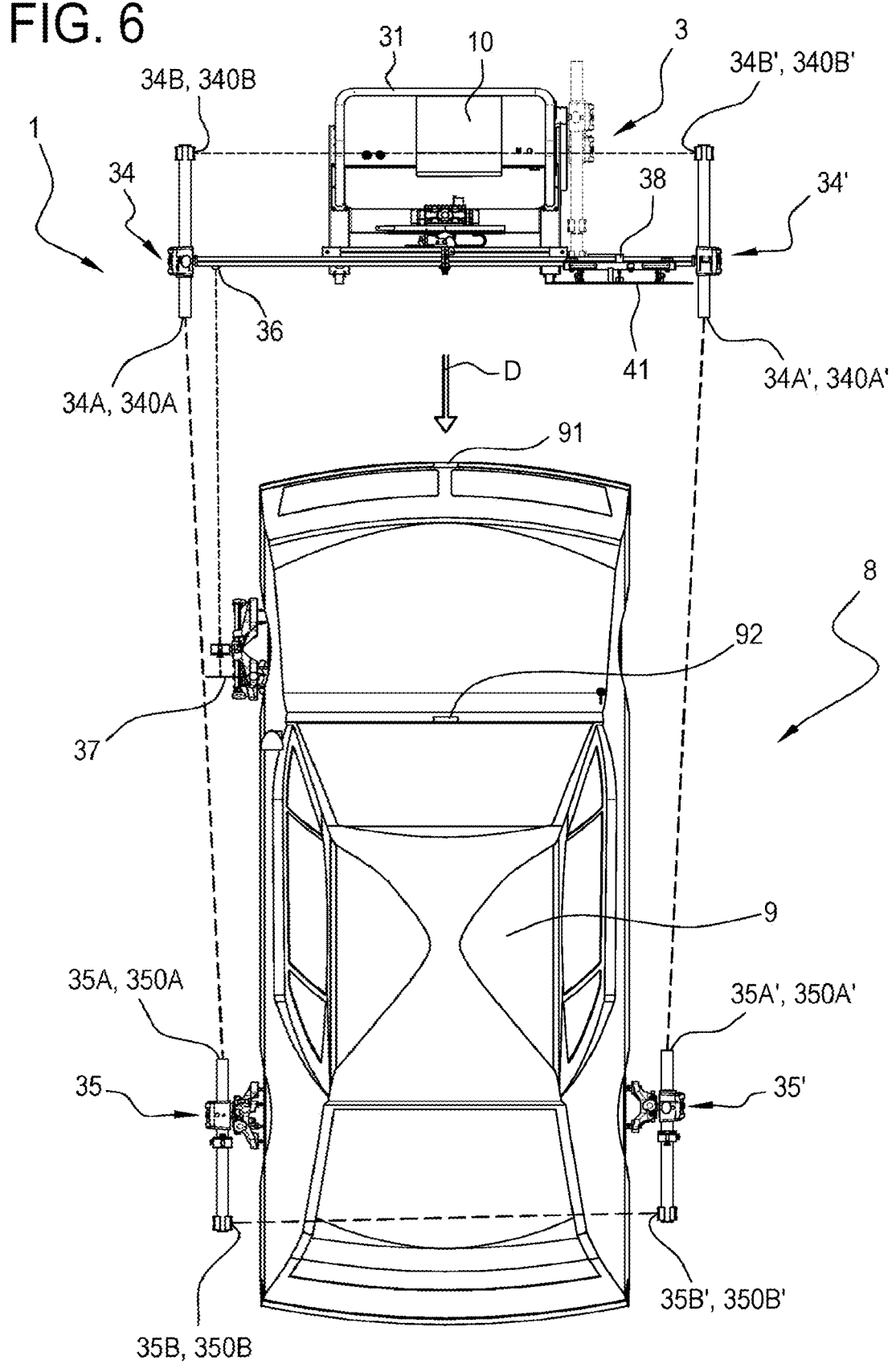
FIG. 6 shows a top view of an apparatus for calibrating an ADAS sensor of a vehicle positioned in a service area, according to a further embodiment of this disclosure.
Figure 7A:
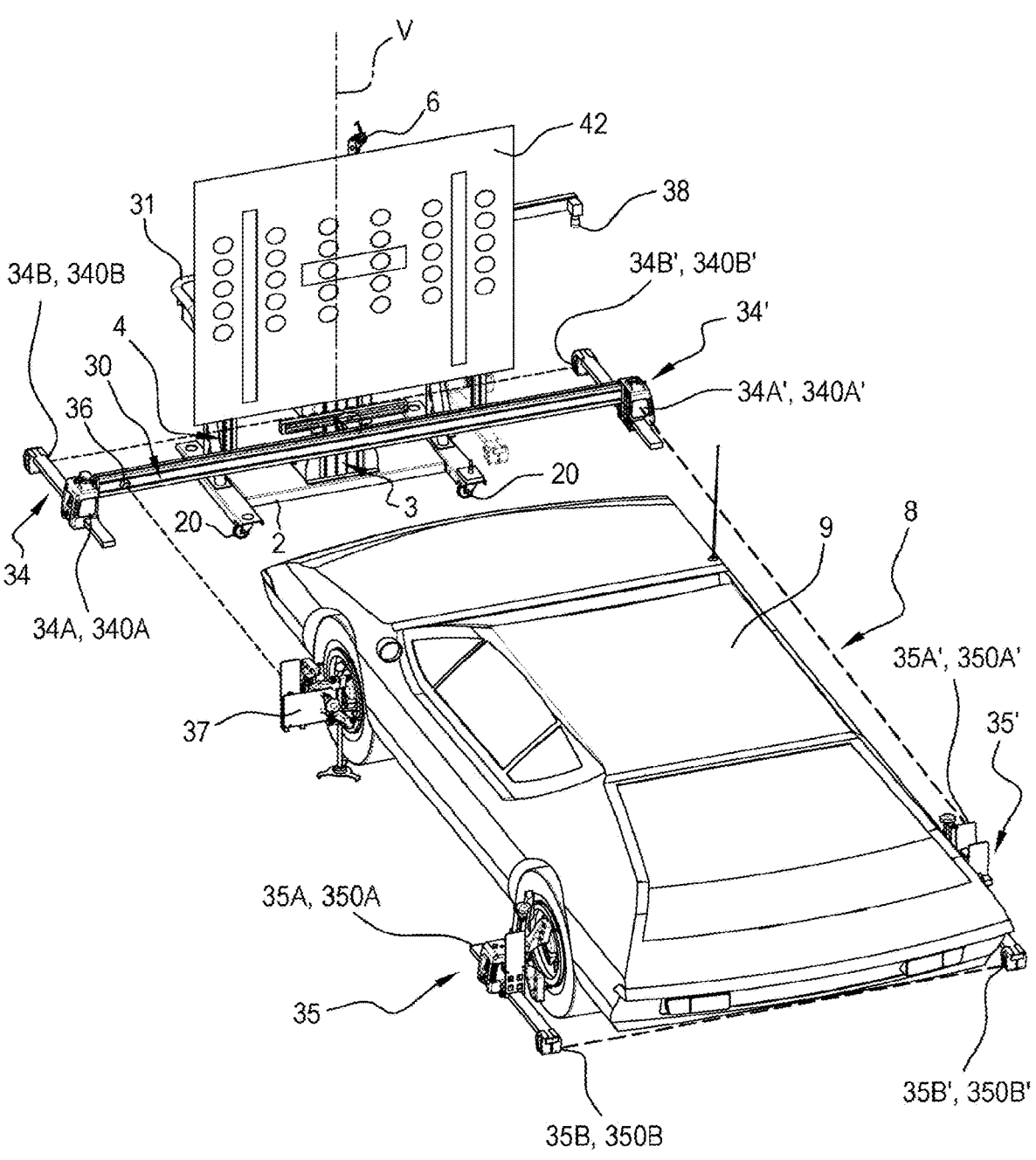
FIGS. 7A and 7B show the apparatus of FIG. 6 in respective operating configurations.
Figure 7B:
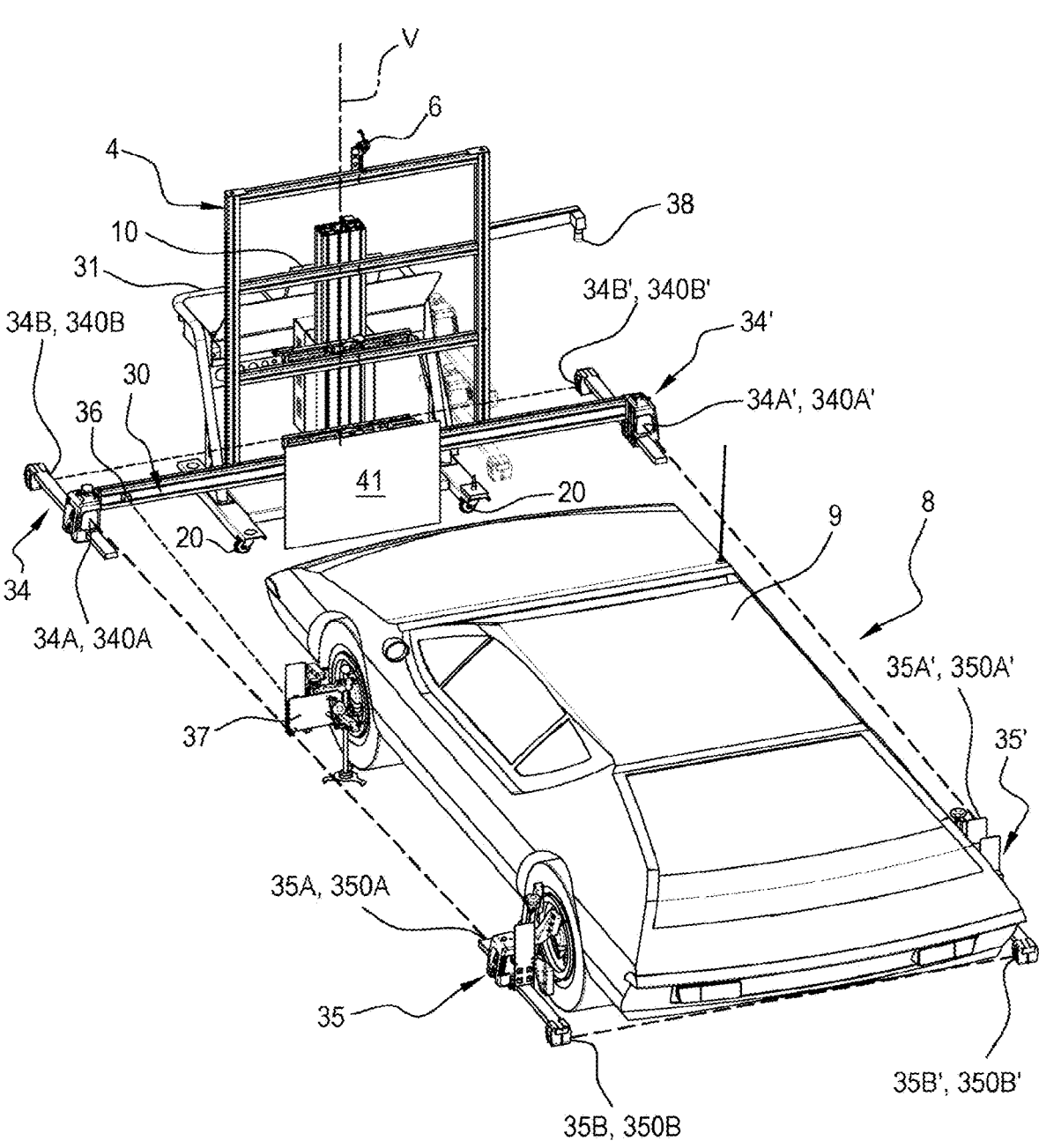
Figure 8A:
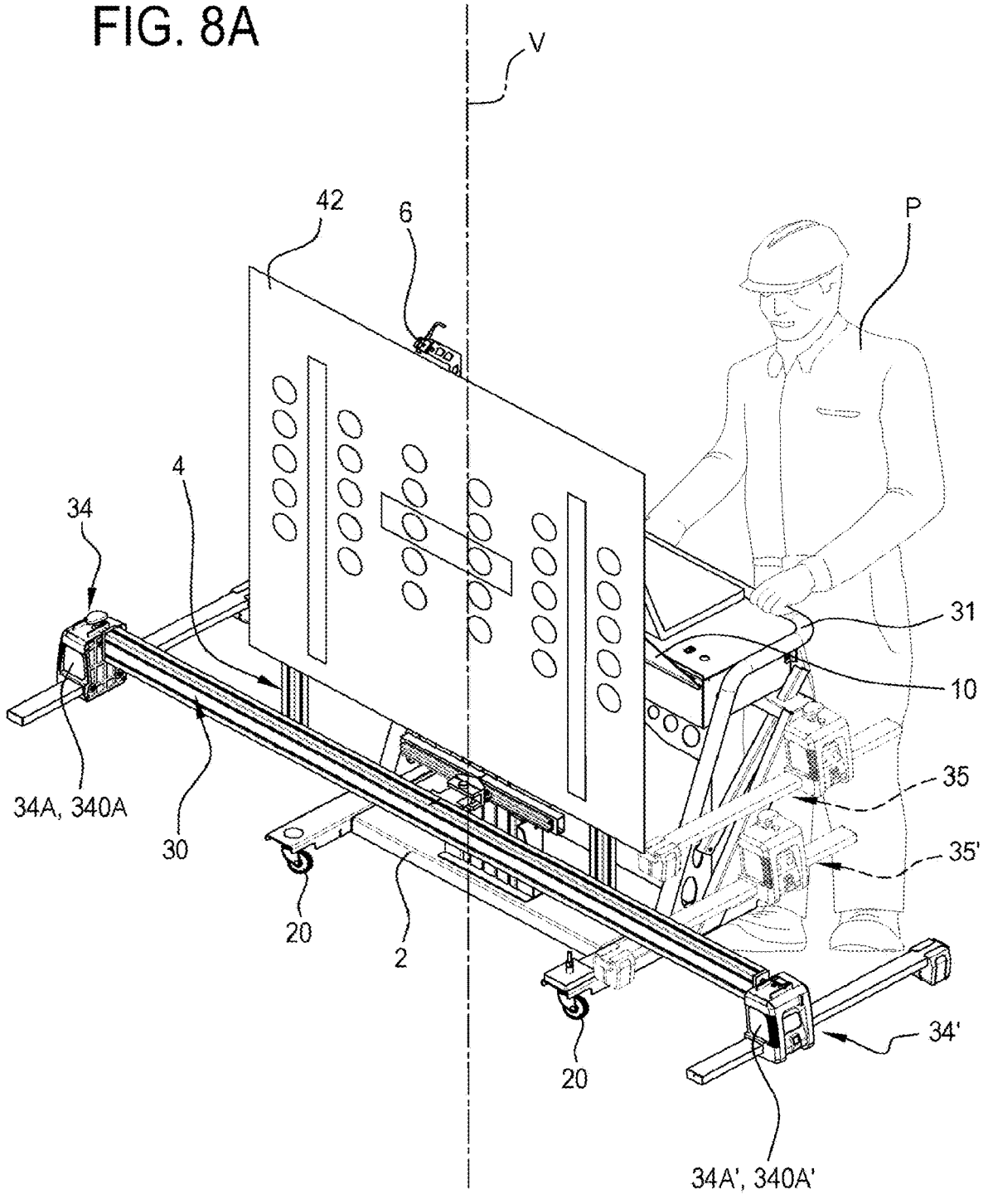
FIGS. 8A and 8B show the support structure of the apparatus in the operating configurations of FIGS. 7A and 7B, respectively.
Figure 8B:
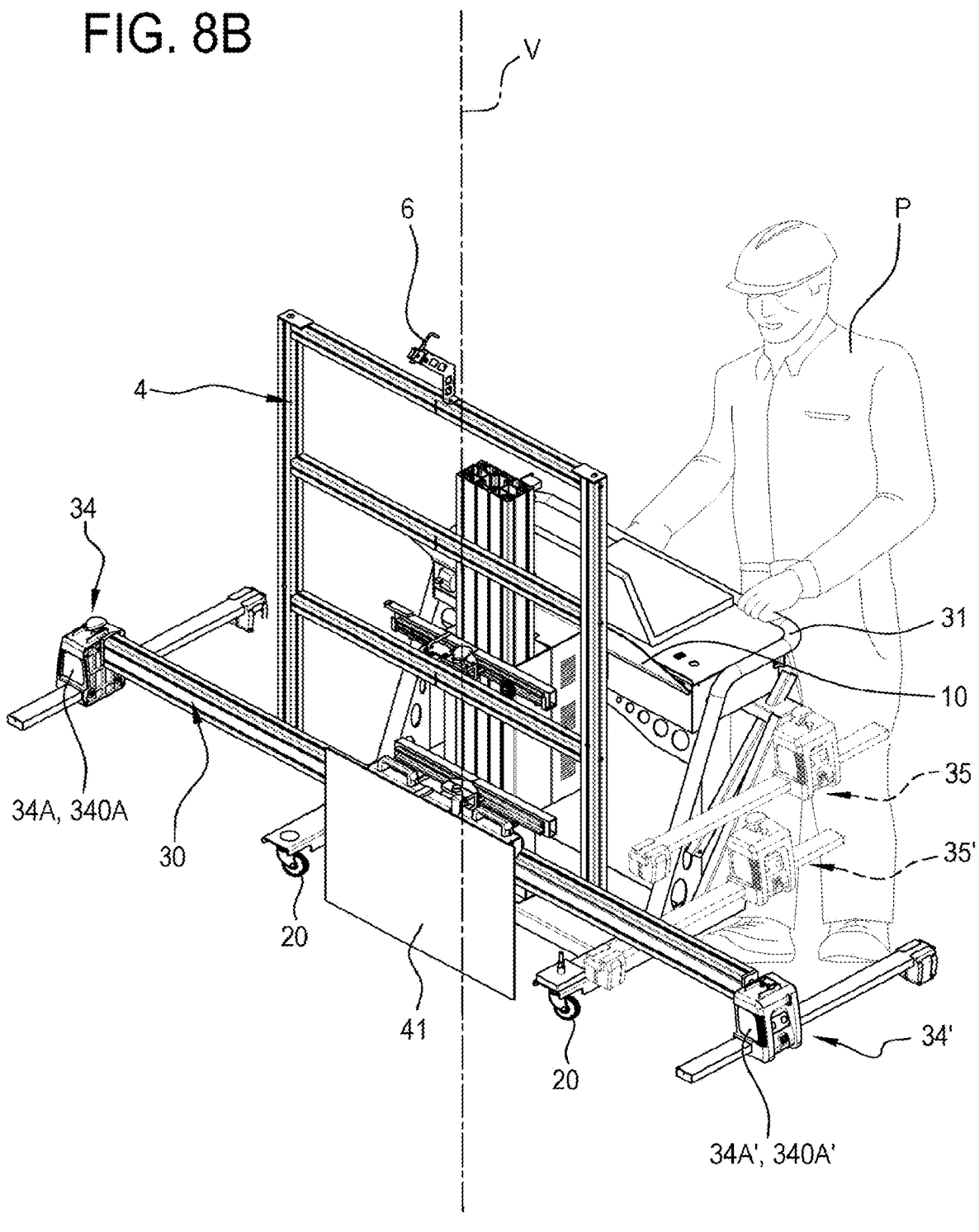
Figures 9, 10:
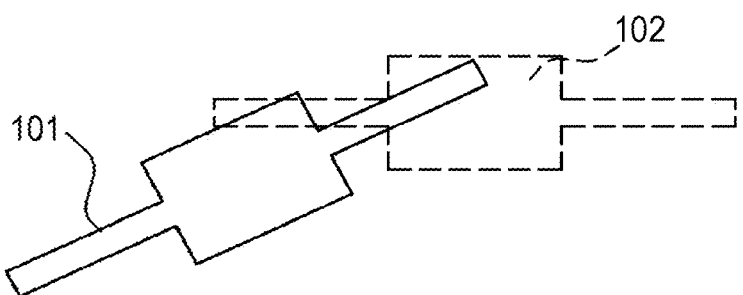
FIG. 9 shows information regarding the actual position and the reference position of the support structure, in an embodiment.
FIG. 10 shows movement instructions for moving the support structure, in an embodiment.

With reference to the accompanying drawings, the numeral 1 denotes an apparatus for calibrating an ADAS sensor of a vehicle 9.

The vehicle 9 is positioned in a service area 8.

The apparatus 1 comprises a base unit 2. The base unit 2 includes a plurality of wheels 20. Preferably, the base unit 2 includes at least three wheels 20. In an embodiment, the base unit 2 includes at least four wheels 20.

The wheels 20 of the plurality rotate or are rotatable about respective axes of rotation R1, R2.

The wheels 20 also swivel about respective swivel axes A1, A2, A3. The swivel axes are oriented perpendicularly to the respective axes of rotation R1, R2.

In an embodiment, the base unit comprises a stabilizer foot (at least one) which is movable between a raised position and a lowered position. The stabilizer foot may be moved by hand or through actuators controlled by the person or by the processing unit. When the structure is being moved, the foot is kept in the raised position; when the structure reaches a predetermined distance from a reference point, the foot is lowered so as to hold the base unit (or a point thereof) in place.

The stabilizer foot, at the lowered position, may serve as a pivot for rotating the structure.

In an embodiment, the base unit comprises two or more stabilizer feet. In an embodiment, the base unit comprises a stabilizer foot for each wheel.

The apparatus 1 comprises a support structure 3, mounted on the base unit 2.

The apparatus 1 comprises a vehicle calibration assistance structure 4. The vehicle calibration assistance structure 4 is mounted on the support structure 3.

In an embodiment, the vehicle calibration assistance structure 4 includes a target panel 42. The target panel 42 bears predetermined graphical features to perform (or assist in the performance of) calibration of a camera of the vehicle 9.

In an embodiment, the vehicle calibration assistance structure 4 includes a reflector 41. The reflector 41 is capable of reflecting electromagnetic waves for performing (or assisting in the performance of) calibration of a radar sensor of the vehicle 9. In an embodiment, the reflector 41 can be moved (on a carriage) in a horizontal direction, at right angles to the vertical direction V.

In an embodiment, the vehicle calibration assistance structure 4 includes a carriage 43, slidably coupled to the support structure 3. More specifically, the carriage 43 is slidable in a vertical direction V to adjust the vehicle calibration assistance structure 4 in height relative to the support structure 3.

In an embodiment, the vehicle calibration assistance structure 4 is tiltable relative to the support structure 3 (about a vertical tilting axis), to vary the orientation of the vehicle calibration assistance structure 4 relative to the support structure 3.

In an embodiment, the support structure 3 is tiltable relative to the base unit 2 (about a vertical tilting axis), to vary the orientation of the support structure 3 relative to the base unit 2.

In an embodiment, the apparatus 1 comprises an optical projection system 6, which includes a laser emitter 60. The laser emitter 60 is configured to project a laser blade or laser beam on the vehicle 9 which is positioned in the service area 8.

The support structure 3 can be driven manually by a person P. In effect, the person P pushes or pulls the support structure 3, which moves on the wheels 20.

Preferably, the support structure 3 includes a grippable portion 31, which is configured to allow (or make it easier for) the person P to grip it with at least one hand. In an embodiment, the support structure 3 includes a first and a second grippable portion 31 configured to allow (or make it easier for) the person P to grip it with a first and a second hand, respectively.

The apparatus 1 comprises a position detector, configured to capture values of a position parameter, representing a position of the support structure 3, in real time.

In an embodiment, the position detector includes a positioning target element 54 of the support structure 3, connected to the support structure 3. In an embodiment, the positioning target element 54 of the support structure 3 is mounted on the vehicle calibration assistance structure 4. In an embodiment, the positioning target element 54 of the support structure 3 is mounted directly on the support structure 3. In an embodiment, the position detector includes a first positioning target element 54, fixed to the support structure 3, and a second positioning target element 54, fixed to the vehicle calibration assistance structure 4.

In an embodiment, the position detector includes a positioning device 5 which is spaced from the support structure. In an embodiment, the positioning device 5 is movable on a respective trolley. In an embodiment, the positioning device 5 is movable on respective rails. The positioning device 5 includes an optical device of the positioning device 5, oriented in a (second) lateral direction L2 to view graphical features of the vehicle 9 (preferably on one of the wheels of the vehicle 9). The optical device of the positioning device 5 includes at least one camera. The optical device of the positioning device 5 preferably includes a first camera 51 and a second camera 52. The first and second cameras 51 and 52 are preferably connected in a stereo configuration. The optical device of the positioning device 5 (i.e. the first and second cameras 51, 52) is configured to view graphical features of a front wheel 93 of the vehicle 9 and/or of a rear wheel 94 of the vehicle 9. That way, the positioning device 5 is positioned at a front axle of the vehicle 9 (if it is to view graphical features of the front wheel 93) or at a rear axle of the vehicle 9 (if it is to view graphical features of the rear wheel 94).

The positioning device 5 includes a matching camera 53 of the positioning device 5, oriented towards the positioning target element 54 of the support structure 3 (that is, oriented in a backward direction, opposite to the forward direction D).

That way, the processing unit compares the values captured by the optical device of the positioning device 5 with those captured by the matching camera 53 of the positioning device 5 so as to derive the information regarding the actual position 101 of the support structure 3 relative to the vehicle 9. The information regarding the actual position 101 of the support structure 3 relative to the vehicle 9 includes one or more of the following information items: distance of the support structure 3 from a reference element of the vehicle 9; orientation of the support structure relative to an axis of the vehicle 9; height of the support structure 3 relative to a reference element of the vehicle 9. The reference element of the vehicle may include: a front logo 91, a front camera 92, a rear logo, a rear camera, a front wheel 93, a rear wheel 94. The axis of the vehicle 9 may include: a thrust axis, an axis of symmetry.

In an embodiment, the position detector includes an optical device of the support structure 3, associated with the support structure 3 (that is, integral with the support structure 3 or, in an embodiment, with the vehicle calibration assistance structure 4). The optical device of the support structure 3 includes at least one camera, directed in the forward direction D, towards the service area 8. The optical device of the support structure 3 preferably includes a first camera 32A and a second camera 32B. The first camera 32A and the second camera 32B are directed towards the service area 8 to view respective graphical features of the vehicle 9 (for example, graphical features of the first and second front wheel of the vehicle, respectively).

In an embodiment, the position detector includes a fixed positioning target element 55. The fixed positioning target element 55 is spaced from the support structure 3. The fixed positioning target element 55 is spaced from the service area 8.

In an embodiment, the position detector includes a matching camera 33 of the support structure 3, mounted on (or integral with) the support structure 3. The matching camera 33 is oriented in a first lateral direction L1 to view the fixed positioning target element 55.

Thus, in an embodiment, the optical device of the support structure 3 views graphical features of the vehicle 9 and, simultaneously, the matching camera 33 of the support structure 3 views the fixed positioning target element 55. The processing unit compares the values captured by the optical device of the support structure 3 with those captured by the matching camera 33 and derives information regarding the actual position 101 of the support structure 3 relative to the vehicle 9.

In an embodiment, the position detector includes a first pair of heads 34, 34' associated with the support structure 3 (preferably at opposite ends of a horizontal bar 30 of the support structure 3, oriented perpendicularly to the vertical direction) and a second pair of heads 35, 35' associated with brackets able to be operatively coupled to respective rear wheels of the vehicle 9 (at a working position). The heads 35, 35' of the second pair are removably accommodated on the support structure, at a rest position.

In a preferred embodiment, the heads 34, 34' and 35, 35' are laser heads and, in other embodiments, are LED/CCD heads.

The heads 34, 34' associated with the support structure 3 each include a first emitter 34A, 34A', and a corresponding first receiver 340A, 340A', configured to detect the corresponding laser head 35, 35' associated with the wheel of the vehicle 9 (in order to detect the orientation of the support structure 3 relative to the thrust axis of the vehicle 9). The heads 34, 34' associated with the support structure 3 each include a second emitter 34B, 34B', and a corresponding second receiver 340B, 340B' directed at the other head 34, 34' of the first pair of heads, in order to view it.

Each head of the second pair of heads 35, 35', associated with the wheels, includes a first emitter 35A, 35A' and a corresponding first receiver 350A, 350A', directed towards the support structure 3 to view a corresponding head 34, 34' of the first pair of heads (or the emitter 34A, 34A' thereof).

Each head of the second pair of heads 35, 35', associated with the wheels, includes a second emitter 35B, 35B' and a corresponding second receiver 350B, 350B', directed towards the other head 35, 35' of the second pair of heads in order to view it.

The first emitter 34A, 34A', the first receiver 340A, 340A', the second emitter 34B, 34B' and the second receiver 340B, 340B' of the first pair of heads 34, 34' are preferably mounted on arms which are directed in directions which make an angle of at least 90° with each other. The first emitter 35A, 35A', the first receiver 350A, 350A', the second emitter 35B, 35B' and the second receiver 350B, 350B' of the second pair of heads 35, 35' are preferably mounted on arms which are directed in directions which make an angle of at least 90° with each other.

In an embodiment, the position detector includes a distance meter 36, or a pair of distance meters 36, associated with the support structure 3 (preferably on the horizontal bar 30, at a position further in than the heads 34, 34') and a positioning target element 37, or a pair of positioning target elements 37, coupled to the front wheels of the vehicle 9. The distance meters 36 are configured to view the respective positioning target elements 37 to measure the distance of the support structure 3 from the vehicle 9.

The heads 34, 34', 35, 35' and the distance meters 36 may be provided in combination or alternatively to each other.

In an embodiment, the distance meters 36 are used to view the target elements 37 and thus to measure both the distance and the orientation of the support structure 3 relative to the vehicle 9.

In an embodiment, the heads 34, 34', 35, 35' and only one distance meter 36 are used; in effect, the heads 34, 34', 35, 35' measure the angular orientation of the support structure 3 and the distance meter 36 measures the distance of the support structure 3 from the vehicle 9.

In an embodiment, the heads 34, 34', 35, 35' are used to measure the angular orientation, and a camera (mounted on the support structure 3) is used to measure the distance of the support structure 3 from the vehicle 9. The distance meter 36 and/or the camera for measuring the distance are connected to the processing unit (hence to the interface). In an embodiment, the distance meter 36 and/or the camera for measuring the distance are connected to the processing unit via Bluetooth; in an embodiment, they are connected via Wi-Fi; in an embodiment, they are connected via a wired connection.

In an embodiment, the position detector includes a height distance meter 38 mounted on the vehicle calibration assistance structure 4 and directed towards the floor the base unit 2 rests on in order to measure the height of the vehicle calibration assistance structure 4 relative to the floor (hence relative to the support structure 3, whose height from the floor is fixed). The height distance meter 38 is particularly useful in the case where the vehicle calibration assistance structure 4 is slidable along the support structure 3 in the vertical direction (on the carriage 43).

In an embodiment, the processing unit is connected to the height distance meter 38 to receive therefrom a signal representing the height measured. In an embodiment, the processing unit is connected to the height distance meter by a wireless connection (for example, Wi-Fi or Bluetooth).

In an embodiment, the processing unit is configured to provide the person with information, through the interface, regarding the height of the vehicle calibration assistance structure 4 from the floor.

In an embodiment, the apparatus includes a height interface, connected to the height distance meter 38 (by wired or wireless connection) and dedicated thereto, to provide the person with the information regarding the height of the vehicle calibration assistance structure 4 from the floor.

In another embodiment, the height distance meter 38 is not provided; in this embodiment, the height of the calibration assistance structure 4 is preferably known (or is entered as input by the person).

The apparatus 1 comprises an interface 10. In an embodiment, the interface 10 comprises a screen. In an embodiment, the interface 10 is positioned on the support structure 3.

The interface 10 is configured to provide the person P driving the support structure 3 with the real time information regarding the actual position 101 of the support structure 3 relative to the vehicle 9.

In an embodiment, the apparatus 1 comprises a memory which includes reference data relating to a predetermined position of a reference calibration device relative to a reference vehicle. The processing unit is configured to derive information regarding a reference position 102 of the support structure 3 relative to the vehicle 9 as a function of the reference data stored in the memory.

In an embodiment, the processing unit is configured to compare in real time the information regarding the actual position 101 with the information regarding the reference position 102 and to provide the person P with information, through the interface 10, regarding a difference between the actual position 101 and the reference position 102 of the support structure 3 relative to the vehicle 9. In an embodiment, the interface 10 is configured to display simultaneously in a spatial coordinate system an image representing the reference position 102 and an image representing the actual position 101; the person P viewing the two images can thus see the extent of the distance, if any, of the actual position 101 from the reference position 102.

In an embodiment, the information regarding the difference between the actual position 101 and the reference position 102 includes movement instructions 103 serving as a guide for the person P moving the support structure 3. In an embodiment, the movement instructions 103 include graphical indications in the form of arrows showing the direction or directions in which the support structure 3 must be moved to reduce the difference between the actual position 101 and the reference position 102. Thus, the arrows indicate that the support structure 3 must be moved towards the vehicle 9 or away from the vehicle 9 in translation parallel to the vehicle 9 and/or in rotation clockwise or anticlockwise.

In an embodiment not illustrated, another graphical indication signifies vertical movements of the calibration assistance structure 4.

In an embodiment, the interface 10 comprises a keyboard.

In an embodiment, the processing unit is configured to receive through the interface 10 a first selection parameter relating to a type of vehicle 9 positioned in the service area 8.

In an embodiment, the processing unit is configured to receive through the interface 10 a second selection parameter relating to a type of ADAS sensor to be calibrated.

In an embodiment, the processing unit is configured to select from the memory, based on the first and second selection parameters, a reference data subset relating to a predetermined position of a reference calibration device, configured to calibrate the ADAS sensor associated with the second selection parameter, relative to a reference vehicle of the type associated with the first selection parameter. In an embodiment, the processing unit is configured to derive the information regarding the reference position 102 of the support structure 3 relative to the vehicle 9 as a function of the reference data subset.

This disclosure also relates to a method for calibrating a sensor of an advanced driver assistance system (ADAS) of a vehicle 9. The vehicle 9 is positioned in a service area 8.

The method comprises a step of preparing a base unit 2 of a support structure 3 which is integral with the base unit 2, and a vehicle calibration assistance structure 4 mounted on the support structure 3. The vehicle calibration assistance structure 4 includes a calibration device configured to facilitate alignment or calibration of the ADAS sensor of the vehicle 9 (and, if necessary, of other ADAS sensors of the vehicle 9).

The method comprises a step of a person P manually positioning the support structure 3 in proximity to the service area 8 in such a way that the sensor of the vehicle 9 can view the calibration device. The step of manually positioning includes rotating (freely, i.e. imparted by the pushing force provided by the person P) a plurality of wheels 20 about respective axes of rotation R1, R2 and swivelling at least one wheel 20 of the plurality of wheels 20, connected to the base unit 2, about a respective swivel axis A1, A2, A3, at right angles to the respective axis of rotation R1, R2.

The method comprises a step of capturing, with a position detector, values of position parameters representing a position of the support structure 3 relative to the vehicle 9.

The method comprises a step of processing in a processing unit the values of position parameters in order to derive information regarding an actual position 101 of the support structure 3 relative to the vehicle 9.

The method comprises a step of providing the person P with the real time information, through an interface 10, regarding the actual position 101 of the support structure 3 relative to the vehicle 9.

In an embodiment, the method comprises a step of deriving information regarding a reference position 102 of the support structure 3 relative to the vehicle 9 as a function of reference data stored in a memory. In an embodiment, the information regarding a reference position 102 of the support structure 3 relative to the vehicle 9 are derived also as a function of one or more selection parameters set by the person P through the interface 10. For example, a first selection parameter set by the person P may regard the type of vehicle 9; a second selection parameter set by the person P may regard the type of ADAS sensor to be calibrated or aligned.

In an embodiment, the method comprises a step of comparing in real time the information regarding the actual position 101 with the information regarding the reference position 102 to provide the person P with information, through the interface 10, regarding a difference between the actual position 101 and the reference position 102 of the support structure 3 relative to the vehicle 9. In an embodiment, the information regarding the difference between the actual position 101 and the reference position 102 includes movement instructions 103 to assist the person P in manually positioning the support structure 3.

In an embodiment, in the step of manually positioning, the person P moves the support structure 3 using the grippable portion 31 and simultaneously looks at the interface 10 to receive the real time information regarding the actual position 101 of the support structure 3 relative to the vehicle 9 (that is, the movement instructions 103).

In an embodiment, the step of positioning includes one or more of the following sub-steps, carried out one after the other or simultaneously: a sub-step of positioning the support structure 3 at a predetermined distance from the vehicle 9, a sub-step of positioning the support structure 3 according to a predetermined orientation relative to the vehicle 9, a sub-step of positioning the vehicle calibration assistance structure 4 at a predetermined height relative to the vehicle or relative to the floor, a sub-step of positioning the vehicle calibration assistance structure 4 according to a predetermined orientation relative to the vehicle 9 (along a vertical and/or horizontal axis).

The invention claimed is:

1. An apparatus for calibrating an ADAS sensor of an advanced driver assistance system of a vehicle positioned in a service area, comprising:
   a base unit, including a plurality of wheels rotating about respective axes of rotation, wherein at least one wheel of the plurality of wheels is pivotable about a respective swivel axis, perpendicular to the respective axis of rotation;
   a support structure connected to the base unit;
   a vehicle calibration assistance structure, mounted on the support structure and including a frame and a calibration device, wherein the calibration device includes a panel configured to facilitate aligning or calibrating the ADAS sensor of the vehicle, wherein the support structure is drivable in such a way that the sensor of the vehicle can detect the calibration device, wherein the panel is positioned in a vertical plane and has a front face oriented in a forward direction to be viewed by the ADAS sensor of the vehicle and a rear face oriented in a backward direction opposite the forward direction, and wherein the frame includes a support structure extending vertically to support the panel oriented in the vertical plane;
   a position detector, including a sensor and configured to capture values of a position parameter, representative of a position of the support structure, in real time;
   a processing unit, including a processor, operatively connected to the position detector and configured to process the values of the position parameter in real time to derive information regarding an actual position of the support structure relative to the vehicle,
wherein the frame of the vehicle calibration assistance structure further includes a first and a second handle providing grippable portions located on the side of the rear face of the panel so that the first and second handle are spaced in the backward direction with respect to the vertical plane, the first handle being spaced from the second handle along a transversal axis,
the transversal axis being inclined with respect to a vertical direction,
the apparatus further comprising a screen configured to provide the person driving the support structure with the real time information regarding the actual position of the support structure relative to the vehicle, wherein the screen has a display viewable by the person holding the first and second handle.

2. The apparatus according to claim 1, comprising a memory which includes reference data relating to a predetermined position of a reference calibration device relative to a reference vehicle, wherein the processing unit is configured to derive information regarding a reference position of the support structure relative to the vehicle as a function of the reference data stored in the memory, the reference calibration device including a reference panel.

3. The apparatus according to claim 2, wherein the processing unit is configured to compare in real time the information regarding the actual position of the support structure with the information regarding the reference position of the support structure in order to provide information regarding a difference between the actual position of the support structure and the reference position of the support structure relative to the vehicle.

4. The apparatus according to claim 3, wherein the information regarding the difference between the actual position of the support structure and the reference position of the support structure includes movement instructions.

5. The apparatus according to claim 1, comprising an interface, configured to provide a person driving the support structure with the real time information regarding the actual position of the support structure relative to the vehicle.

6. The apparatus according to claim 1, comprising a motion actuator connected to the base unit for moving the support structure, wherein the processing unit is configured to generate a drive signal as a function of the information regarding the actual position of the support structure relative to the vehicle and to send the drive signal to the motion actuator in order to move the support structure.

7. The apparatus according to claim 1, wherein the support structure is manually driveable by a person, and wherein the apparatus comprises an interface including the screen, mounted on the support structure or on the vehicle calibration assistance structure.

8. The apparatus according to claim 1, wherein each one of the first and the second handle include a curved portion.

9. The apparatus according to claim 1, wherein, with respect to the transversal axis, the screen is interposed between the first handle and the second handle.

10. The apparatus according to claim 1, wherein the vehicle calibration assistance structure is movable relative to the support structure along a vertical direction, wherein the position detector includes a height distance meter including a further sensor mounted on the vehicle calibration assistance structure and directed towards a floor the base unit rests on, in order to measure a height of the vehicle calibration assistance structure relative to the floor.

11. The apparatus according to claim 1, wherein the position detector includes:
   at least one distance meter including an emitter/transmitter and mounted on the vehicle calibration assistance structure or on the support structure;
   a positioning target element including a further panel and associated with a wheel of the vehicle, wherein the at least one distance meter is configured to measure the distance of the positioning target element from the vehicle calibration assistance structure or from the support structure.

12. The apparatus according to claim 1, wherein the position detector includes:
   an optical device, mounted on the support structure and oriented in a first direction, to view graphical features of the vehicle;
   a positioning target element, including a further panel and positioned in a predetermined position, at a distance from the support structure;
   a matching camera mounted on the support structure and oriented in a second direction, to view the positioning target element.

13. The apparatus according to claim 1, wherein the position detector includes:
   a positioning target element, including a further panel and associated with the vehicle calibration assistance structure and oriented in a forward direction towards the service area;

a positioning device, which is spaced from the support structure and includes:

an optical device, oriented in a lateral direction to view graphical features of the vehicle, a matching camera, oriented towards the support structure to see the positioning target element.

14. The apparatus according to claim 1, wherein the vehicle calibration assistance structure includes a reflector, the reflector being configured for reflecting electromagnetic waves for performing calibration of a radar sensor of the vehicle.

15. The apparatus according to claim 1, wherein the calibration device includes a target panel having a surface bearing a combination of predetermined graphical features, the calibration device being configured to calibrate an ADAS camera of the vehicle.

16. The apparatus according to claim 1, wherein the screen is mounted on the support structure removably.

17. The apparatus according to claim 1, wherein the screen is movably associated with the support structure so it can be oriented.

18. The apparatus according to claim 1, wherein the transversal axis is perpendicular to the vertical direction.

19. An apparatus for calibrating an ADAS sensor of an advanced driver assistance system of a vehicle positioned in a service area, comprising:

a base unit, including a plurality of wheels rotating about respective axes of rotation, wherein at least one wheel of the plurality of wheels is pivotable about a respective swivel axis, perpendicular to the respective axis of rotation;

a support structure connected to the base unit;

a vehicle calibration assistance structure, mounted on the support structure and including a frame and calibration device, wherein the calibration device includes a panel oriented in a plane and configured to facilitate aligning or calibrating the ADAS sensor of the vehicle, wherein the support structure is drivable in such a way that the sensor of the vehicle can detect the calibration device;

a position detector, including a sensor and configured to capture values of a position parameter, representative of a position of the support structure, in real time;

a processing unit, including a processor, operatively connected to the position detector and configured to process the values of the position parameter in real time to derive information regarding an actual position of the support structure relative to the vehicle, wherein the support structure is manually drivable by a person, and wherein the frame of the vehicle calibration assistance structure is configured to support a screen for providing the person driving the support structure with the real time information regarding the actual position of the support structure relative to the vehicle, wherein the support structure includes a first and a second handle providing grippable portions which can be held by the person to drive the support structure manually, the first handle being spaced from the second handle along a transversal axis, the transversal axis being inclined with respect to a vertical direction.

20. An apparatus for calibrating an ADAS sensor of an advanced driver assistance system of a vehicle positioned in a service area, comprising:

a base unit, including a plurality of wheels rotating about respective axes of rotation, wherein at least one wheel of the plurality of wheels is pivotable about a respective swivel axis, perpendicular to the respective axis of rotation;

a support structure connected to the base unit;

a vehicle calibration assistance structure, mounted on the support structure and including a frame and a calibration device, wherein the calibration device includes a panel configured to facilitate aligning or calibrating the ADAS sensor of the vehicle, wherein the support structure is drivable in such a way that the sensor of the vehicle can detect the calibration device, wherein the panel is positioned in a vertical plane and has a front face oriented in a forward direction to be viewed by the ADAS sensor of the vehicle and a rear face oriented in a backward direction opposite the forward direction, and wherein the frame includes a support structure extending vertically to support the panel oriented in the vertical plane;

a position detector, including a sensor and configured to capture values of a position parameter, representative of a position of the support structure, in real time;

a processing unit, including a processor, operatively connected to the position detector and configured to process the values of the position parameter in real time to derive information regarding an actual position of the support structure relative to the vehicle, wherein the frame of the vehicle calibration assistance structure further includes a first and a second handle providing grippable portions, the first handle being spaced from the second handle along a transversal axis, the transversal axis being inclined with respect to a vertical direction, the apparatus further comprising a screen configured to provide the person driving the support structure with the real time information regarding the actual position of the support structure relative to the vehicle, wherein the screen has a display viewable by the person holding the first and second handle.

* * * * *